(12) United States Patent
Yamada et al.

(10) Patent No.: US 9,866,292 B2
(45) Date of Patent: Jan. 9, 2018

(54) BASE STATION APPARATUS, TERMINAL DEVICE, TRANSMISSION METHOD, AND RECEPTION METHOD

(71) Applicant: Sharp Kabushiki Kaisha, Osaka-shi, Osaka (JP)

(72) Inventors: Ryota Yamada, Osaka (JP); Hiromichi Tomeba, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/100,701

(22) PCT Filed: Nov. 20, 2014

(86) PCT No.: PCT/JP2014/080824
§ 371 (c)(1),
(2) Date: Jun. 1, 2016

(87) PCT Pub. No.: WO2015/087685
PCT Pub. Date: Jun. 18, 2015

(65) Prior Publication Data
US 2016/0308595 A1 Oct. 20, 2016

(30) Foreign Application Priority Data
Dec. 13, 2013 (JP) .................................. 2013-257537

(51) Int. Cl.
*H04B 7/0456* (2017.01)
*H04B 7/0413* (2017.01)
(Continued)

(52) U.S. Cl.
CPC ......... *H04B 7/0456* (2013.01); *H04B 7/0413* (2013.01); *H04B 7/0678* (2013.01); *H04L 5/0007* (2013.01); *H04B 7/10* (2013.01)

(58) Field of Classification Search
CPC .. H04B 7/0413; H04B 7/0678; H04B 7/0417; H04B 7/0456; H04L 5/0007
(Continued)

(56) References Cited

U.S. PATENT DOCUMENTS

2005/0190849 A1* 9/2005 McNamara .......... H04B 7/0691
375/267
2009/0207931 A1* 8/2009 Ohwatari .......... H04L 25/03343
375/267
(Continued)

FOREIGN PATENT DOCUMENTS

JP 2010-516170 A 5/2010
JP 2012-525056 A 10/2012
(Continued)

OTHER PUBLICATIONS

Official Communication issued in International Patent Application No. PCT/JP2014/080824, dated Jan. 27, 2015.
(Continued)

*Primary Examiner* — Michael Neff
(74) *Attorney, Agent, or Firm* — Keating & Bennett, LLP

(57) ABSTRACT

Good transmission performance is obtained even when the difference between the number of transmit antennas and the number of receive antennas is small. A modulation symbol is subjected to spreading and code multiplexing in a receive antenna direction of a terminal device, is subjected to precoding, and is transmitted. A spreading ratio of a spreading code for performing the spreading in the receive antenna direction is equal to the number of receive antennas of the terminal device. Spreading code multiplexing is performed in the receive antenna direction. Thus, it is possible to provide a base station apparatus and a terminal device providing good transmission performance by changing the number of multiplexing operations even when the difference between the number of transmit antennas and the number of receive antennas is small.

12 Claims, 6 Drawing Sheets

(51) Int. Cl.
    *H04B 7/06*  (2006.01)
    *H04L 5/00*  (2006.01)
    *H04B 7/10*  (2017.01)

(58) Field of Classification Search
    USPC .......................................................... 375/267
    See application file for complete search history.

(56)    References Cited

U.S. PATENT DOCUMENTS

| | | |
|---|---|---|
| 2010/0046650 A1 | 2/2010 | Jongren et al. |
| 2010/0098012 A1 | 4/2010 | Bala et al. |
| 2011/0310825 A1 | 12/2011 | Hu et al. |
| 2012/0039298 A1 | 2/2012 | Lee et al. |
| 2013/0163536 A1* | 6/2013 | Anderson ......... H04W 72/1284 370/329 |
| 2015/0124732 A1* | 5/2015 | Seo ....................... H04L 5/0048 370/329 |

FOREIGN PATENT DOCUMENTS

| | | |
|---|---|---|
| JP | 2012-531114 A | 12/2012 |
| JP | 2013-532429 A | 8/2013 |

OTHER PUBLICATIONS

Rusek et al., "Scaling up MIMO: Opportunities and Challenges with Very Large Arrays", IEEE Signal Processing Magazine, Jan. 2013, pp. 40-60.

\* cited by examiner

BASE STATION APPARATUS, TERMINAL DEVICE, TRANSMISSION METHOD, AND RECEPTION METHOD

TECHNICAL FIELD

The present invention relates to a base station apparatus, a terminal device, a transmission method, and a reception method.

BACKGROUND ART

Multiple Input Multiple Output (MIMO) transmission, in which a plurality of transmit antennas and a plurality of receive antennas are used for transmission, can increase the transmission rate without expanding the frequency bandwidth, and is thus used in Long Term Evolution (LTE), wireless Local Area Networks (LAN), and the like.

In recent years, MIMO transmission using a significantly increased number of antennas has received attention. Such MIMO transmission is referred to as Massive MIMO, Large Scale MIMO, Full Dimension MIMO, or the like. When the number of transmit antennas is notably greater than the number of receive antennas, a large difference is caused between the gain with respect to a desired signal and the gain with respect to an interference signal merely by using $H^H$ as a precoding matrix, where H is the channel matrix of MIMO. Thus, interference can be very easily reduced. Such Massive MIMO is disclosed in NPL 1.

CITATION LIST

Non Patent Literature

NPL 1: F. Rusek, D. Persson, K. Lau, E. G. Larsson, T. L. Marzetta, O. Edfors, and F. Tufvesson, "Scaling up MIMO: Opportunities and Challenges with Very Large Arrays," IEEE Signal Processing Magazine, January 2013.

SUMMARY OF INVENTION

Technical Problem

However, the technique described in NPL 1 is effective only when the number of transmit antennas is notably greater than the number of the receive antennas. As the number of receive antennas increases, the difference between the gain with respect to the desired signal and the gain with respect to the interference signal decreases, and therefore, transmission performance may degrade.

In view of the above problems, the present invention was realized, and the present invention aims to provide a base station apparatus, a terminal device, a transmission method, and a reception method which provide good transmission performance even when the difference between the number of transmit antennas and the number of receive antennas is small.

Solution to Problem

To solve the problems described above, the base station apparatus and the terminal device according to the present invention have the following configurations.

A base station apparatus of the present invention is configured to perform spreading and code multiplexing on a modulation symbol in a receive antenna direction of a terminal device, perform precoding on the modulation symbol, and perform transmission of the modulation symbol.

In the base station apparatus of the present invention, a spreading ratio of a spreading code with which the spreading in the receive antenna direction is performed is equal to the number of receive antennas of the terminal device.

The base station apparatus of the present invention is configured to determine the number of the code multiplexing operations based on information representing the number of code multiplexing operations fed back from the terminal device.

In the base station apparatus of the present invention, a weighting matrix of the precoding is selected from a preset codebook.

The base station apparatus of the present invention is configured to perform the transmission by using a plurality of polarized wave antennas.

The base station apparatus of the present invention is configured to perform spreading in a time direction in addition to the receive antenna direction.

The base station apparatus of the present invention is configured to perform spreading in a frequency direction in addition to the receive antenna direction.

A terminal device of the present invention includes a despreading unit configured to perform despreading in a receive antenna direction on reception signals each received by a corresponding receive antenna.

The terminal device of the present invention is configured to feed back information representing the number of code multiplexing operations to a base station apparatus.

The terminal device of the present invention is configured to select a precoding matrix from a codebook for each of the receive antennas and to feed back information representing the precoding matrix to the base station apparatus.

The terminal device of the present invention further includes a plurality of polarized wave antennas, in which the despreading is performed in a direction of the plurality of polarized wave antennas.

A transmission method of the present invention includes performing spreading and code multiplexing on a modulation symbol in a receive antenna direction of a terminal device, performing precoding on the modulation symbol, and performing transmission of the modulation symbol.

A reception method of the present invention includes a despreading step of performing despreading in a receive antenna direction on reception signals each received by a corresponding receive antenna.

Advantageous Effects of Invention

In the present invention, spreading code multiplexing is performed in the receive antenna direction. Thus, it is possible to obtain good transmission performance by varying the number of multiplexing operations even when the difference between the number of transmit antennas and the number of receive antennas is small.

DESCRIPTION OF EMBODIMENTS

Embodiments of the present invention will be described below. A communication system of the embodiments includes a base station apparatus (transmitter, cell, transmission point, transmit antenna group, transmit antenna port group, component carrier, eNodeB) and a terminal device (mobile terminal, reception point, receiving terminal, receiver, receive antenna group, receive antenna port group, User Equipment). While a downlink will be described in the embodiments below, the present invention is not limited to these embodiments and is also applicable to an uplink. In the embodiments below, examples in which the present invention is applied to Orthogonal Frequency Division Multiplexing (OFDM) will be described, but the present invention is not limited to these embodiments and is also applicable to other systems such as single carrier transmission systems.

(First Embodiment)

Figure 1:
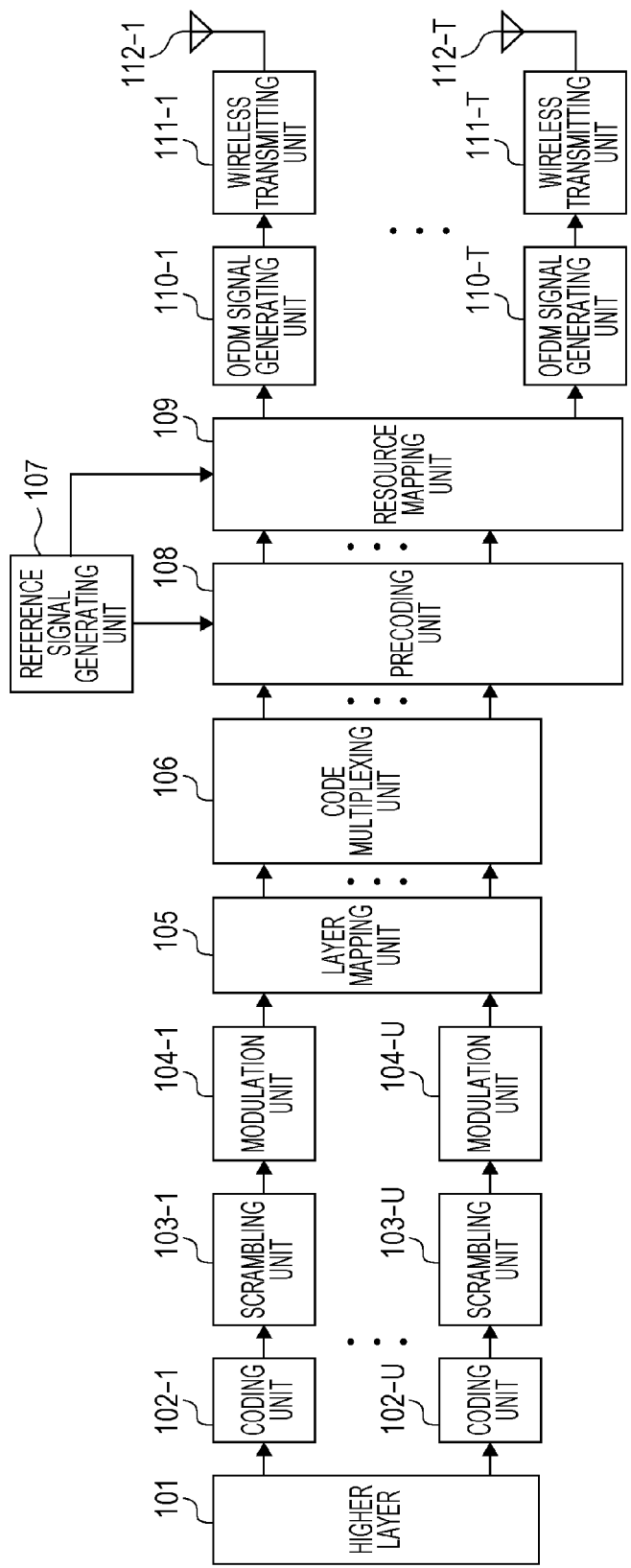
FIG. 1 is a block diagram schematically illustrating a base station apparatus of a first embodiment.

FIG. 1 is a block diagram schematically illustrating the configuration of a base station apparatus of the present embodiment. The base station apparatus includes a higher layer 101, coding units 102-1 to 102-U, scrambling units 103-1 to 103-U, modulation units 104-1 to 104-U, a layer mapping unit 105, a code multiplexing unit 106, a precoding unit 107, a reference signal generating unit 108, a resource mapping unit 109, OFDM signal generating units 110-1 to 110-T, wireless transmitting units 111-1 to 111-T, and transmit antennas 112-1 to 112-T. In the figure, U represents the number of codewords and T represents the number of transmit antennas. When some or all of the functional blocks of the base station apparatus are made into a chip to form an integrated circuit, a chip control circuit configured to control each of the functional blocks is provided.

With respect to layers of communication functions as defined in the OSI reference model, the higher layer 101 is a layer having a function at a higher level than the Physical Layer. The higher layer 101 is, for example, the Media Access Control (MAC) layer, the data link layer, the network layer, or the like. The higher layer 101 also performs notification of other parameters. Each unit included in the base station apparatus uses such parameters to perform its function.

The coding units 102-1 to 102-U perform error correction coding on information data input from the higher layer 101 and generate coding bits (also referred to as codewords). Examples of the information data include audio signals during telephone calls, still image signals or moving image signals representing captured images, character messages, and the like. Examples of a coding system used by the coding units 102-1 to 102-U to perform the error correction coding include Turbo Coding, Convolutional Coding, Low-Density Parity Check coding (LDPC), and the like.

The coding units 102-1 to 102-U may perform a rate-matching process on a coding bit sequence so that the coding rate of a data sequence after the error correction coding is matched to a coding rate corresponding to the data transmission rate. Moreover, the coding units 102-1 to 102-U may have a function of performing interleaving by rearranging the data sequence after the error correction coding.

The scrambling units 103-1 to 103-U scramble each of the codewords based on a corresponding cell ID.

The scrambled codewords are mapped to modulation symbols in the modulation units 104-1 to 104-U. Examples of a modulation process performed by the modulation units 104-1 to 104-U include Binary Phase Shift Keying (BPSK), Quadrature Phase Shift Keying (QPSK), M-Quadrature Amplitude Modulation (M-QAM, for example, M=16, 64, 256, 1024, or 4096), or the like. The modulation units 104-1 to 104-U may have a function of performing interleaving by rearranging the generated modulation symbols.

The modulation symbols are subjected to layer mapping by the layer mapping unit 105 for spatial multiplexing. The number of layers is denoted by S.

The code multiplexing unit 106 subjects the signals after the layer mapping to spreading code multiplexing in a receive antenna direction (layer direction, spatial direction) of a terminal device by using a spreading code. As the spreading code, a Hadamard code, a Discrete Fourier Transform (DFT) sequence, a Gold code, or the like can be used regardless of whether it is an orthogonal code or a quasi-orthogonal code. A spreading ratio is determined based on the number of receive antennas of the terminal device. The maximum spreading ratio with respect to a terminal device is the number of receive antennas. The spreading ratio may be varied for each terminal device. Spread multiplexing may be performed based on space-time block coding. In this case, the code length of a space-time block code corresponds to the spreading ratio of the present embodiment. Conventionally, the space-time block coding is coding across time (or frequency) and transmit antennas, whereas, when the present invention is used, the space-time block coding is coding across time (or frequency) and receive antennas.

The reference signal generating unit 107 generates reference signals and outputs to the precoding unit 108 the reference signals which will be precoded and outputs to the resource mapping unit 109-1 to 109-T the reference signals which will not be precoded.

The precoding unit 108 performs the precoding to form beams. For example, a transmission maximum ratio combining weight, a Zero Forcing (ZF) weight, etc. can be used. The reference signals input from the reference signal generating unit 107 are also precoded.

The resource mapping unit 109 maps outputs from the precoding unit 109 and the reference signals to resources. Here, the resource is a domain including a predetermined frequency band and/or a predetermined time segment.

The OFDM signal generating units 110-1 to 110-T perform Inverse Fast Fourier Transform (IFFT) on outputs from the resource mapping unit 109 and insert Cyclic Prefixes (CP) into the outputs. The outputs are subjected to digital-analog conversion, filtering, frequency conversion, and the like by the transmission units 111-1 to 111-T and are transmitted from the transmit antennas 112-1 to 112-T.

Figure 2:
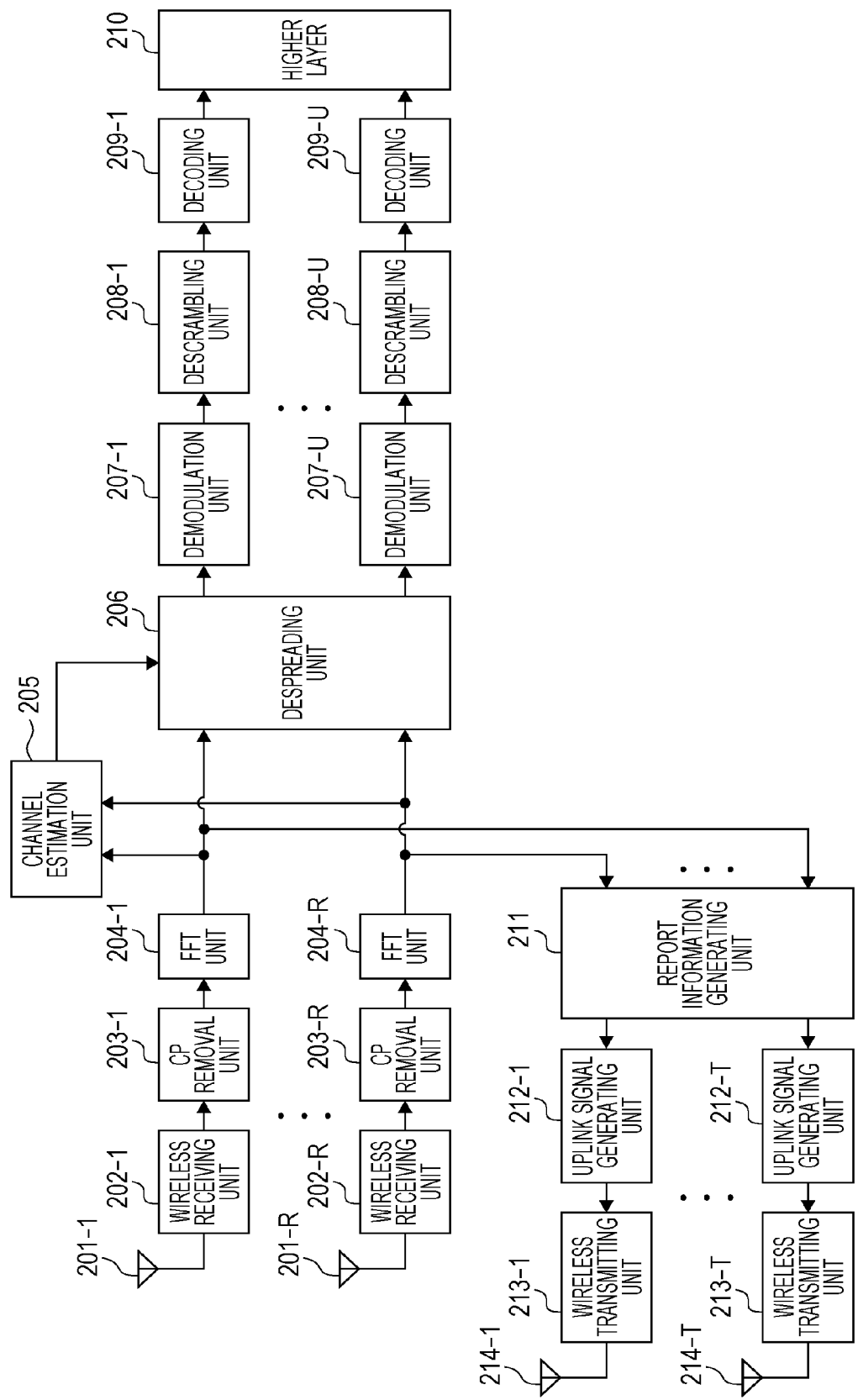
FIG. 2 is a block diagram schematically illustrating a terminal device of the first embodiment.

FIG. 2 is a block diagram schematically illustrating the configuration of the terminal device of the present embodiment. The terminal device includes receive antennas 201-1 to 201-R, wireless receiving units 202-1 to 202-R, CP removal units 203-1 to 203-R, FFT units 204-1 to 204-R, a channel estimation unit 205, a despreading unit 206, demodulation units 207-1 to 207-U, descrambling units 208-1 to 208-U, decoding units 209-1 to 209-U, a higher layer 210, a report information generating unit 211, uplink signal generating units 212-1 to 212-T, wireless transmitting units 213-1 to 213-T, and transmit antennas 214-1 to 214-T. In the figure, R represents the number of receive antennas. The number of transmit antennas of the terminal device is denoted by T and is the same as that of the base station apparatus. However, the number of transmit antennas of the terminal device may be the same as or different from the number of transmit antennas of the base station apparatus. When some or all of the functional blocks of the terminal device are made into a chip to form an integrated circuit, a chip control circuit (not shown) configured to control each of the functional blocks is provided.

The terminal device receives the signals via the receive antennas 201-1 to 201-R. The wireless receiving units 202-1 to 202-R perform frequency conversion, filtering, analog-digital conversion, and the like. The CP removal units 203-1 to 203-R remove the cyclic prefixes of the outputs from the wireless receiving units 202-1 to 202-R. The FFT units 204-1 to 204-R perform time-frequency transform of the outputs from the CP removal units 203-1 to 203-R. The channel estimation unit 205 performs channel estimation by using a data demodulation reference signal and/or a channel measuring reference signal. The despreading unit 206 performs despreading in the receive antenna direction. Each of the signals after the despreading is demodulated in a corresponding one of the demodulation units 207-1 to 207-U to obtain bit Log Likelihood Ratios (LLR). The descrambling units 208-1 to 208-U decode the scrambling performed by the base station apparatus. The decoding units 209-1 to 209-U perform error correcting demodulation on outputs from the descrambling units 208-1 to 208-U to obtain information data and output the obtained information data to the higher layer 210.

The terminal device also has a transmission function. The report information generating unit 211 generates signals, for example, Channel State Information (CSI) signals, to be reported to the base station apparatus. Examples of channel state information include Channel Quality Indicator (CQI), channel estimation value, Rank Indicator (RI), Precoding Matrix Indicator (PMI), and the like. The report information can be a spreading ratio and/or the number of code multiplexing operations. The uplink signal generating units 212-1 to 212-T generate uplink signals from the information data obtained from the higher layer 210, the report information, etc. The uplink signals are signals including Single Carrier-Frequency Division Multiple Access (SC-FDMA) symbols or OFDMA symbols. The uplink signals are subjected to digital-analog conversion, filtering, frequency conversion, and the like by the wireless transmitting units 213-1 to 213-T and are output from the transmit antennas 214-1 to 214-T.

The detailed operation of the base station apparatus and the terminal device will be described with reference to expressions. In the present embodiment, the base station apparatus spatially multiplexes up to R sequences and transmits the spatially multiplexed R sequences to one terminal device. Here, an example in which four sequences are spatially multiplexed will be described. Then, each output signal s from the layer mapping unit 105 in FIG. 1 is expressed in accordance with Expression (1) below.

[Math. 1]

$$s=[s_1\ s_2\ s_3\ s_4]^T \quad (1)$$

Here, the superscript T represents a transposed matrix. In the code multiplexing unit 106, the output signal s is code-multiplexed as denoted by Expression (2) below. As an example, a case where the code multiplexing is performed by using an orthogonal code as denoted by Expression (3) will be described.

[Math. 2]

$$Cs \quad (2)$$

$$C = \frac{1}{2}\begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (3)$$

The precoding unit 108 performs precoding on Expression (2), which is denoted by Expression (4) below. The base station apparatus transmits the signal denoted by Expression (4).

[Math. 3]

$$WCs \quad (4)$$

Here, W is a T-row, four-column precoding matrix. It is possible to obtain W as, for example, a transmission maximum ratio combining weight as denoted by Expression (5) below or a ZF weight as denoted by Expression (6) below.

[Math. 4]

$$W=H^H \quad (5)$$

$$W=H^H(HH^H)^{-1} \quad (6)$$

Here, H is a four-row, T-column channel matrix including channels between each transmit antenna and a corresponding one of the receive antennas as elements. Thus, the base station apparatus has to know the channel matrix. For example, in the case of Time Division Duplex (TDD), the reciprocity of the channels can be used to perform channel estimation in the base station apparatus. When the reciprocity of the channels is not available even in the case of the TDD, or when Frequency Division Duplex (FDD) is used, the channel matrix can be fed back from the terminal device to the base station apparatus. The feedback of the channel matrix may be a direct feedback from the terminal device to the base station apparatus or may be performed via other base stations, relay stations, or other terminal devices.

The reception signal of the terminal device can be expressed in accordance with Expression (7). Note that Expression (7) represents a reception signal in a sub-carrier of signals output from the FFT units 204-1 to 204-R in FIG. 2.

[Math. 5]

$$r=HWCs+n \quad (7)$$

Here, n is a noise vector. Here, it is assumed that precoding is performed in accordance with Expression (5). In this case, an equivalent channel matrix including the precoding matrix is expressed in accordance with Expression (8) below.

[Math. 6]

$$HH^H = \begin{pmatrix} \|h_1\|^2 & h_1 h_2^H & h_1 h_3^H & h_1 h_4^H \\ h_2 h_1^H & \|h_2\|^2 & h_2 h_3^H & h_2 h_4^H \\ h_3 h_1^H & h_3 h_2^H & \|h_3\|^2 & h_3 h_4^H \\ h_4 h_1^H & h_4 h_2^H & h_4 h_3^H & \|h_4\|^2 \end{pmatrix} \quad (8)$$

$$H=[h_1^T\ h_2^T\ \ldots\ h_R^T]^T \quad (9)$$

$$h_r=[h_{r,1}\ h_{r,2}\ \ldots\ h_{r,T}] \quad (10)$$

Here, $h_r$ represents a T-dimensional vector including channels between the r-th receive antenna and each of the transmit antennas as elements. Moreover, $h_{rt}$ represents channels between the r-th receive antenna and the t-th transmit antenna. The diagonal elements of Expression (8) are desired channels, and the non-diagonal elements are interference channels. As T increases compared with R, Expression (8) is likely to resemble an identity matrix. Therefore, if the number of transmit antennas is large, the transmission maximum ratio combining weight can easily provide good transmission performance. Since the ZF weight also reduces interference, the amount of computation increases compared with the transmission maximum ratio combining weight, but the ZF weight provides better transmission performance.

The equivalent channel matrix expressed in accordance with Expression (8) shows that one stream is transmitted to one receive antenna. When the number of streams is varied, the number of receive antennas has to be changed. Thus, in the precoding with a weight as denoted by Expression (5) or (6), the weight has to be newly obtained to vary the number of streams even when the channel is not fluctuated. Therefore, the number of streams cannot be easily changed. Thus, in the present embodiment, code multiplexing is performed in accordance with Expression (2). This code multiplexing shows that spreading and code multiplexing in the receive antenna direction are performed. Thus, when the number of streams is smaller than the number of receive antennas, the number of streams can be easily varied simply by changing the number of code multiplexing operations without obtaining the precoding matrix. Therefore, even when the difference between the number of transmit antennas and the number of receive antennas is small, the transmission performance can be improved by reducing the number of code multiplexing operations.

Since the signals are subjected to code multiplexing in the receive antenna direction in the base station apparatus before being transmitted, the despreading unit 206 of the terminal device performs despreading in the receive antenna direction in accordance with Expression (11) below.
[Math. 7]

$$C^H r \qquad (11)$$

It is also possible to perform the despreading after performing detection on each receive antenna.

As described above, in the present embodiment, the base station apparatus subjects the signals to the spreading and the code multiplexing in the receive antenna direction and then transmits the signals, and the terminal device performs the despreading in the receive antenna direction. Thus, the number of streams can be easily varied simply by changing the number of code multiplexing operations. Therefore, communication can be performed with a desired number of streams, thereby improving the transmission performance.

(Second Embodiment)

Figure 3:
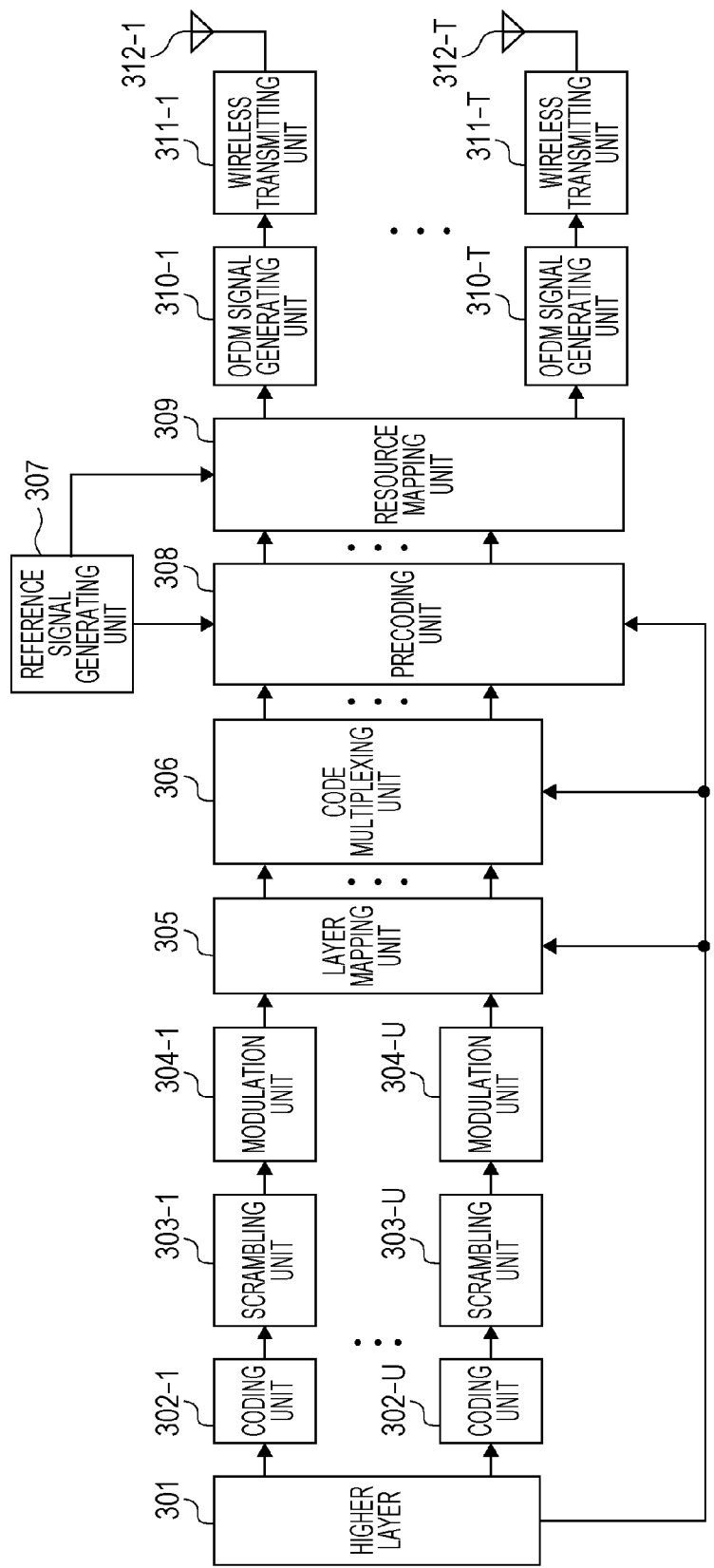
FIG. 3 is a block diagram schematically illustrating a base station apparatus of a second embodiment.

FIG. 3 is a block diagram schematically illustrating the configuration of a base station apparatus of the present embodiment. The base station apparatus includes a higher layer 301, coding units 302-1 to 302-U, scrambling units 303-1 to 303-U, modulation units 304-1 to 304-U, a layer mapping unit 305, a code multiplexing unit 306, a precoding unit 307, a reference signal generating unit 308, a resource mapping unit 309, OFDM signal generating units 310-1 to 310-T, wireless transmitting units 311-1 to 311-T, and transmit antennas 312-1 to 312-T. When some or all of the functional blocks of the base station apparatus are made into a chip to form an integrated circuit, a chip control circuit configured to control each of the functional blocks is provided. The present embodiment is different from the first embodiment in that a precoding matrix is not obtained from channels but is selected from a predetermined codebook. Other components are similar to those of the first embodiment, and thus description of such components is omitted.

Based on information reported by each of the terminal devices, the higher layer 301 notifies the layer mapping unit 305 of the number of layers, the code multiplexing unit 306 of the spreading ratio and the number of code multiplexing operations, and the precoding unit 308 of the PMI. The layer mapping unit 305 performs layer mapping according to the number of layers. The code multiplexing unit 306 performs spreading and code multiplexing respectively according to the notified spreading ratio and the notified number of code multiplexing operations. The precoding unit 308 performs precoding corresponding to the PMI.

Figure 4:
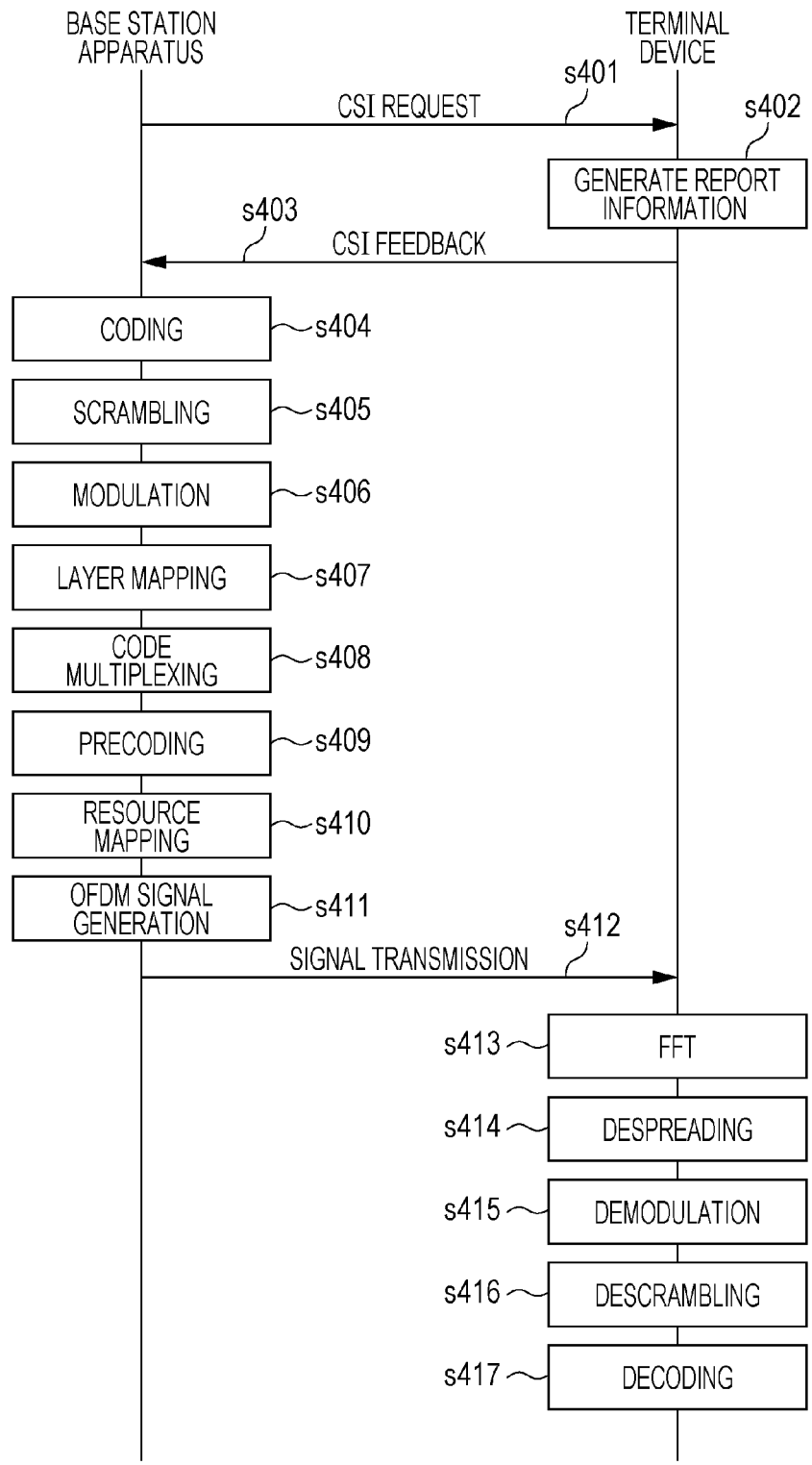
FIG. 4 is a sequence diagram of the base station apparatus and a terminal device of the second embodiment.

FIG. 4 is a sequence diagram illustrating processes between the base station apparatus and each terminal device of the present embodiment. The base station apparatus requests the terminal device to feed back the CSI (step s401). In the terminal device, the report information generating unit 211 generates report information to be fed back to the base station apparatus (step s402). The terminal device transmits the report information to the base station apparatus (step s403).

In the base station apparatus, the coding units 302-1 to 302-U perform error correction coding (step s404), the scrambling units 303-1 to 303-U perform scrambling (step s405), and the modulation units 304-1 to 304-U perform modulation (step s406). In step s407, the layer mapping unit 305 maps modulation symbols to the layers. In step s408, the code multiplexing unit 306 performs spreading and code multiplexing in a receive antenna direction. In step s409, the precoding unit 308 performs precoding. In step s410, the resource mapping unit 309 maps the modulation symbols to resources. In step s411, the OFDM signal generating units 310-1 to 310-T generate OFDM signals. In step s412, the OFDM signals generated in step s411 are transmitted to the terminal device.

In the terminal device, the FFT units 204-1 to 204-R perform FFT on reception signals (step s413), the despreading unit 206 performs despreading in the receive antenna direction (step s414), the demodulation units 207-1 to 207-U perform demodulation (step s415), the descrambling units 208-1 to 208-U perform descrambling (step s416), and the decoding units 209-1 to 209-U perform error correcting demodulation (step s417).

As described above, in the present embodiment, the precoding matrix is selected from the codebook. Thus, the terminal device does not need to feed back a channel matrix, and therefore, an information amount to be fed back can be reduced. The precoding matrix to be fed back may be obtained for each receive antenna to which the spreading is performed.

(Third Embodiment)

Figure 5:
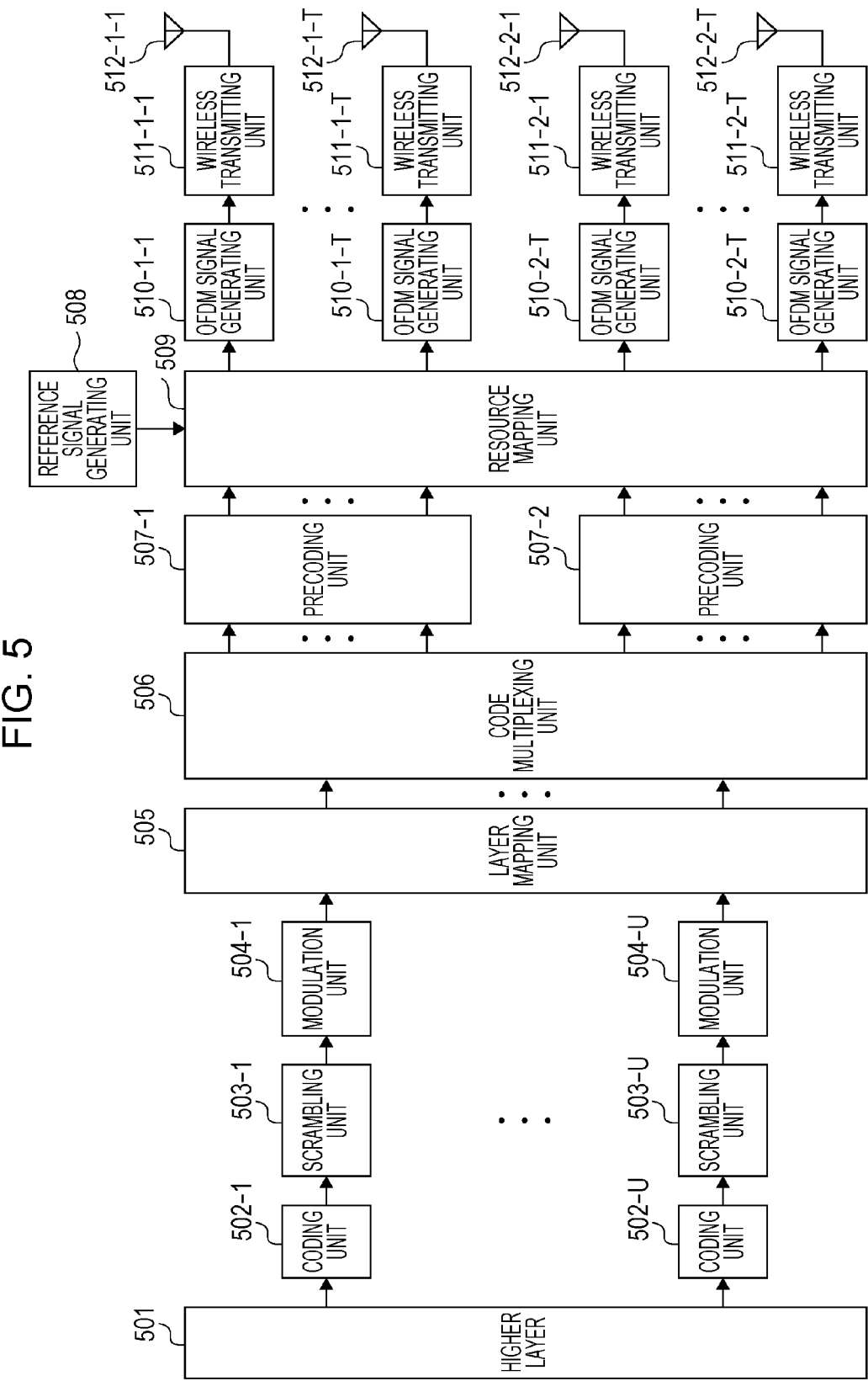
FIG. 5 is a block diagram schematically illustrating a base station apparatus of a third embodiment.

FIG. 5 is a block diagram schematically illustrating the configuration of a base station apparatus of the present embodiment. The base station apparatus includes a higher layer 501, coding units 502-1 to 502-U, scrambling units 503-1 to 503-U, modulation units 504-1 to 504-U, a layer mapping unit 505, a code multiplexing unit 506, precoding units 507-1, 507-2, a reference signal generating unit 508, a resource mapping unit 509, OFDM signal generating units 510-1-1 to 510-1-T, 510-2-1 to 510-2-T, wireless transmitting units 511-1-1 to 511-1-T, 511-2-1 to 511-2-T, and transmit antennas 512-1-1 to 512-1-T, 512-2-1 to 512-2-T.

In the present embodiment, the transmit antennas 512-1-1 to 512-1-T and the transmit antennas 512-2-1 to 512-2-T transmit different polarized waves. Examples of the polarized waves include vertically polarized waves, horizontally polarized waves, circularly polarized wave, and the like. In the present embodiment, an example in which two types of polarized wave antennas are used for transmission will be described, but the present invention is not limited to this embodiment. The number of each type of polarized wave antenna is the same, T, but the number of each type of polarized wave antenna may differ.

Since blocks other than the precoding units 507-1, 507-2 are similar to those of the first and second embodiments, only the precoding units 507-1, 507-2 will be described in this embodiment. The precoding units 507-1, 507-2 are precoding units for different polarized waves. For the precoding, for example, Expressions (5) or (6) can be used, or a codebook can be used. Different precoding methods may be used for different polarized waves. For example, a weight as denoted by Expression (5) or (6) can be used for a polarized wave, and a codebook can be used for another polarized wave. Alternatively, Expression (5) can be used for a polarized wave and Expression (6) can be used for another polarized wave.

Figure 6:
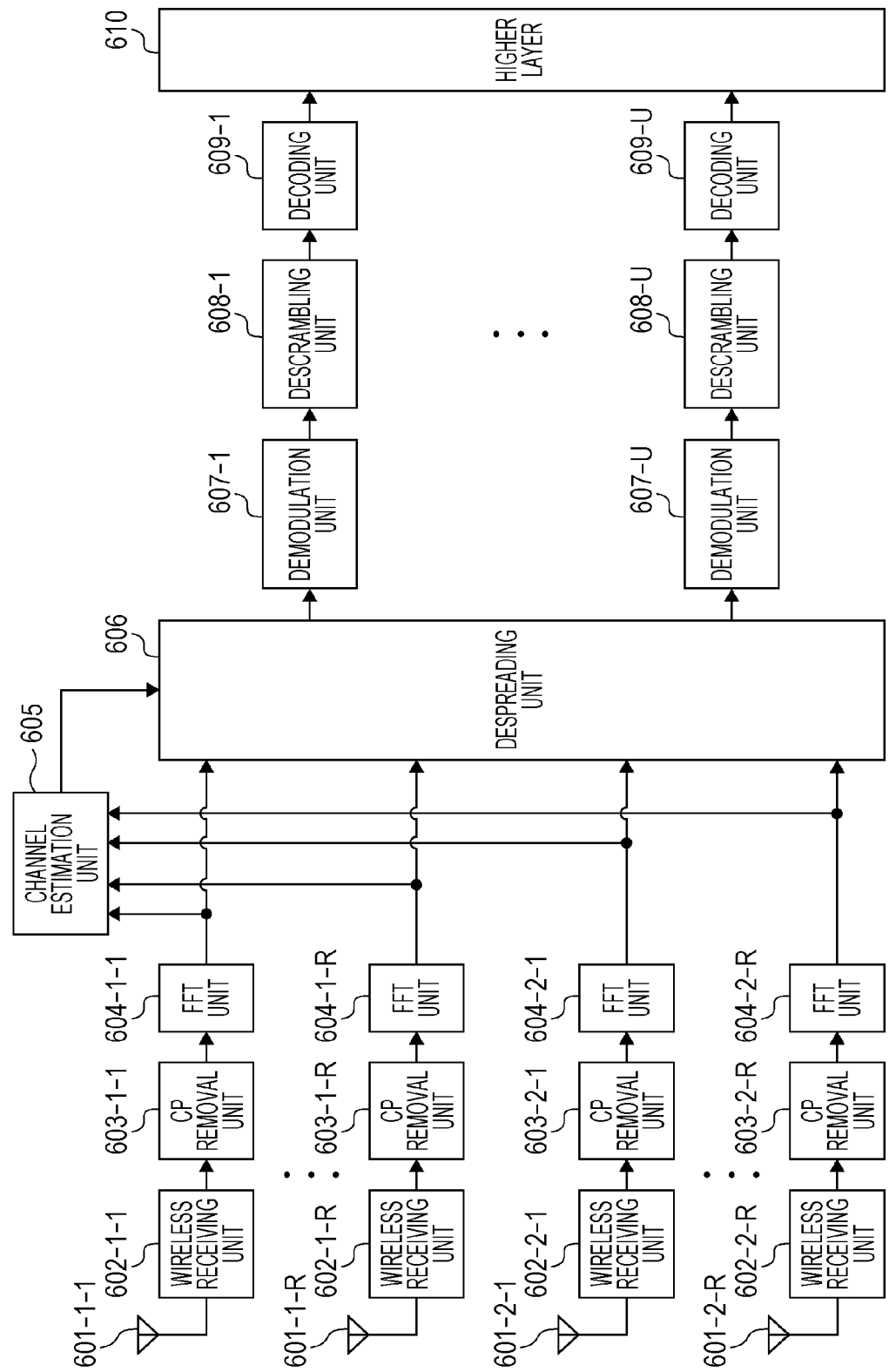
FIG. 6 is a block diagram schematically illustrating a terminal device of the third embodiment.

FIG. 6 is a block diagram schematically illustrating the configuration of a terminal device of the present embodiment. The terminal device includes receive antennas 601-1-1 to 601-1-R, 601-2-1 to 601-2-R, wireless receiving units 602-1-1 to 602-1-R, 602-2-1 to 602-2-R, CP removal units 603-1-1 to 603-1-R, 603-2-1, 603-2-R, FFT units 604-1-1 to 604-1-R, 604-2-1 to 604-2-R, a channel estimation unit 605, a despreading unit 606, demodulation units 607-1 to 607-U, descrambling units 608-1 to 608-U, decoding units 609-1 to 609-U, and a higher layer 610.

Here, the receive antennas 601-1-1 to 601-1-R and the receive antennas 601-2-1 to 601-2-R are different types of polarized wave antennas. The number of each type of polarized wave antenna is R, but the number of each type of polarized wave antenna may differ.

The terminal device receives signals via the receive antennas 601-1-1 to 601-1-R, 601-2-1 to 601-2-R. The wireless receiving units 602-1-1 to 602-1-R, 602-2-1 to 602-2-R perform frequency conversion, filtering, analog-digital conversion, and the like. The CP removal units 603-1-1 to 603-1-R, 603-2-1 to 603-2-R remove cyclic prefixes from outputs of the wireless receiving units 602-1-1 to 602-1-R, 602-2-1 to 602-2-R. The FFT units 604-1-1 to 604-1-R, 604-2-1 to 604-2-R perform time-frequency transform. The channel estimation unit 605 performs channel estimation by using reference signals. The despreading unit 606 performs despreading. The despreading is performed in a receive antenna direction. The subsequent processes are similar to those of the first and second embodiments, and thus description of such processes is omitted.

As described above, in the present embodiment, communication is performed by using a plurality of types of polarized wave antennas. Thus, interference can be reduced, and therefore, transmission performance can be improved.

In the present embodiment, the spreading is performed for the plurality of types of polarized wave antennas, but the spreading may be performed for the same types of polarized wave antennas.

As described above, in the first to third embodiments, examples in which the spreading is performed only in the receive antenna direction of the terminal device have been described, but the spreading may be performed in a time direction, in a frequency direction, etc. in addition to a spatial direction. The spreading is performed in the time direction or in the frequency direction to reduce interference between streams, thereby improving transmission performance.

Moreover, in the first to third embodiments, examples in which the spreading and the code multiplexing in the receive antenna direction of the terminal device are performed have been described, but the code multiplexing can be performed after interleaving by rearranging the spread signals. In this case, the terminal device performs deinterleaving, which is an inverse process of the interleaving, after detection and then the terminal device performs a despreading process. In the case where the signals are multiplexed after the interleaving, the same spreading codes and different interleaving patterns may be used for the signals which are multiplexed. The interleaving described here can be performed not only in the receive antenna direction of the terminal device but also in the time direction and/or the frequency direction.

Furthermore, in the first to third embodiments, examples in which a spreading code is used for the spreading process have been described, but the present embodiments also include a case where the spreading process is performed by channel coding. For example, the present invention also includes a case where the spreading process is performed by channel coding at a coding rate R instead of a spreading code with a spreading ratio R. Also in this case, different interleaving processes can be applied to signals to be multiplexed. The terminal device may perform the interleaving after detection and then the terminal device may perform channel demodulation. When the terminal device performs the despreading process on a signal, the terminal device can use information of other signals which have been detected, and the process can be repeated.

Programs which run on the base station apparatus and mobile station apparatus of the present invention are programs for controlling a CPU and the like (programs for operating a computer) so that the functions of the embodiments relating to the present invention are realized. Information processed in these apparatuses is temporarily accumulated in a RAM during processing, is then stored in various ROMs or HDDs, and is accordingly subjected to read, modify, and/or write operations. A recording medium for storing the programs may be a semiconductor medium (for example, ROM, nonvolatile memory card, etc.), an optical recording medium (for example, DVD, MO, MD, CD, BD, etc.), a magnetic recording medium (for example, magnetic tape, flexible disk, etc.), or the like. The functions of the embodiments are realized by executing loaded programs, but the functions of the embodiments may also be realized by performing processes based on instructions of the programs in combination with an operating system, other application programs, and the like.

When the programs are released to the market, the programs can be stored on portable recording media and released or can be transferred to server computers connected via a network such as the Internet. In this case, memory of server computers is included in the present invention. Some or all of the functional units of the mobile station apparatus and the base station apparatus of the embodiments may typically be realized as an LSI, which is an integrated circuit. The functional blocks of the receiver may be individually made into chips, or some or all of the functional blocks may be integrated into a chip. When functional blocks are made into an integrated circuit, an integrated circuit controlling unit for controlling the functional blocks is added.

A method for fabricating an integrated circuit is not limited to using LSI but may be realized by using a dedicated circuit or a general purpose processor. When progress in semiconductor technology provides an integrated circuit technology replacing LSI, an integrated circuit formed by the provided integrated circuit technology can be used.

The invention of the present application is not limited to the embodiments described above. The terminal device of the invention of the present application is not limited to application to the mobile station apparatus. The terminal device is of course applicable to stationary or immovable electronic devices, for example, AV equipment, kitchen appliances, cleaning/washing devices, air conditioning apparatuses, office equipment, vending machines, and other living appliances installed indoors or outdoors.

While preferred embodiments of the invention have been described in detail with reference to the drawings, specific configurations are not limited to these embodiments, and designs and other modifications which do not depart from the spirit of the invention are included within the scope of the claims.

INDUSTRIAL APPLICABILITY

The present invention is suitable for use in base station apparatuses, terminal devices, transmission methods, and reception methods.

This PCT application claims the priority benefit of Japanese Patent Application No. 2013-257537 filed with the Japan Patent Office on Dec. 13, 2013, the content of which is incorporated herein by reference in its entirety.

REFERENCE SIGNS LIST 101, 210, 301, 501, 610 HIGHER LAYER
102-1 to 102-U, 302-1 to 302-U, 502-1 to 502-U CODING UNIT
103-1 to 103-U, 303-1 to 303-U, 503-1 to 503-U SCRAMBLING UNIT
104-1 to 104-U, 304-1 to 304-U, 504-1 to 504-U MODULATION UNIT
105, 305, 505 LAYER MAPPING UNIT
106, 306, 506 CODE MULTIPLEXING UNIT
107, 307, 508 REFERENCE SIGNAL GENERATING UNIT
108, 308, 507-1, 507-2 PRECODING UNIT
109, 309, 509 RESOURCE MAPPING UNIT
110-1 to 110-T, 310-1 to 310-T, 510-1-1 to 510-1-T, 510-2-1 to 510-2-T OFDM SIGNAL GENERATING UNIT
111-1 to 111-T, 213-1 to 213-T, 311-1 to 311-T, 511-1-1 to 511-1-T, 511-2-1 to 511-2-T WIRELESS TRANSMITTING UNIT
112-1 to 112-T, 214-1 to 214-T, 312-1 to 312-T, 512-1-1 to 512-1-T, 512-2-1 to 512-2-T TRANSMIT ANTENNA
201-1 to 201-R, 601-1-1 to 601-1-R RECEIVE ANTENNA
202-1 to 202-R, 602-1-1 to 602-1-R WIRELESS RECEIVING UNIT
203-1 to 203-R, 603-1-1 to 603-1-R CP REMOVAL UNIT
204-1 to 204-R, 604-1-1 to 604-1-R FFT UNIT
205, 605 CHANNEL ESTIMATION UNIT
206, 606 DESPREADING UNIT
207-1 to 207-U, 607-1 to 607-U DEMODULATION UNIT
208-1 to 208-U, 608-1 to 608-U DESCRAMBLING UNIT
209-1 to 209-U, 609-1 to 609-U DECODING UNIT
211 REPORT INFORMATION GENERATING UNIT
212-1 to 212-T UPLINK SIGNAL GENERATING UNIT

The invention claimed is:

1. A base station apparatus that communicates with a terminal device, comprising:
   modulation circuitry that generates modulation symbols from a bit sequence;
   code multiplexing circuitry that performs spreading and code multiplexing; and
   precoding circuitry that performs precoding from an output from the code multiplexing circuitry; wherein
   a maximum spreading ratio of a spreading code with which a spreading in a receive antenna direction is performed is equal to a number of receive antennas of the terminal device.

2. The base station apparatus of claim 1, wherein the base station apparatus determines a number of operations of the code multiplexing based on information representing the number of the operations of the code multiplexing fed back from the terminal device.

3. The base station apparatus of claim 1, wherein a weighting matrix of the precoding is selected from a preset codebook.

4. The base station apparatus of claim 1, wherein the base station apparatus performs a transmission by using a plurality of polarized wave antennas.

5. The base station apparatus of claim 1, wherein the base station apparatus performs spreading in a time direction in addition to the receive antenna direction.

6. The base station apparatus of claim 1, wherein the base station apparatus performs spreading in a frequency direction in addition to the receive antenna direction.

7. A terminal device that communicates with a base station apparatus, comprising:
   wireless receive circuitry that receives reception signals; and
   despreading circuitry that performs despreading in a receive antenna direction on reception signals each received by a corresponding receive antenna; wherein
   a maximum spreading ratio of a spreading code with which the despreading in a receive antenna direction is performed is equal to a number of receive antennas.

8. The terminal device of claim 7, wherein the terminal device feeds back information representing a number of code multiplexing operations to the base station apparatus.

9. The terminal device of claim 7, wherein the terminal device selects a precoding matrix from a codebook for each of the receive antennas and feeds back information representing the precoding matrix to the base station apparatus.

10. The terminal device of claim 7, further comprising:
    a plurality of polarized wave antennas, wherein
    the despreading is performed in a direction of the plurality of polarized wave antennas.

11. A communication method in a base station apparatus that communicates with a terminal apparatus, comprising:
    a modulation step of generating modulation symbols from a bit sequence;
    a code multiplexing step of performing spreading and code multiplexing; and
    a precoding step of performing precoding from output of the code multiplexing step, wherein
    a maximum spreading ratio of a spreading code with which the spreading in a receive antenna direction is performed is equal to a number of receive antennas of the terminal apparatus.

12. A communication method in a terminal apparatus that communicates with a base station apparatus, comprising:

a wireless receive step of receiving reception signals; and a despreading step of performing despreading in a receive antenna direction on reception signals each received by a corresponding receive antenna, wherein a maximum spreading ratio of a spreading code with which the despreading in the receive antenna direction is performed is equal to a number of receive antennas.

* * * * *